Jan 6, 1931.  L. KOENNECKE  1,787,687

WEEDING HOE

Filed June 18, 1929

Inventor:
Lothar Koennecke
By B. Singer, Atty.

Patented Jan. 6, 1931

1,787,687

UNITED STATES PATENT OFFICE

LOTHAR KOENNECKE, OF BERLIN, GERMANY

WEEDING HOE

Application filed June 18, 1929, Serial No. 371,867, and in Germany June 18, 1928.

It is known to hingedly connect implements for loosening the soil with a handle so that by pulling the handle backwards and forwards the implement loosens the soil or performs hoeing movements or the like. With these automatically reversing implements the handle is stressed to such an extent that it not only easily breaks but also greatly hinders work. The implements are very apt to penetrate too deeply into the soil and thereby hamper the actual loosening work, so that the working itself is very tiring.

It has been found that with such oscillatably driven soil cultivating implements the effect is most uniform and perfect and requires the least effort if the point of application of the force is as near as possible to the implement. This is effected according to the present invention in that the point of application of the force is arranged below the pivot axis and situated as near as possible to the implement. Hereby the handle engages an oscillatable tongue mounted in a bearing of the frame carrying the implement.

A further advantage of the construction according to the invention consists in that through the special shape of the band-like tool the roots of the plants are also attacked.

Several embodiments of the invention are illustrated by way of example in the accompanying drawing in which.

Figure 1:
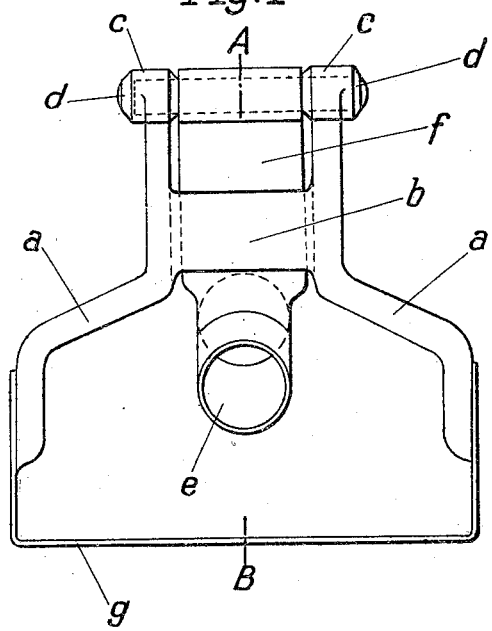
Fig. 1 shows in front elevation the soil loosening implement.
Figure 2:
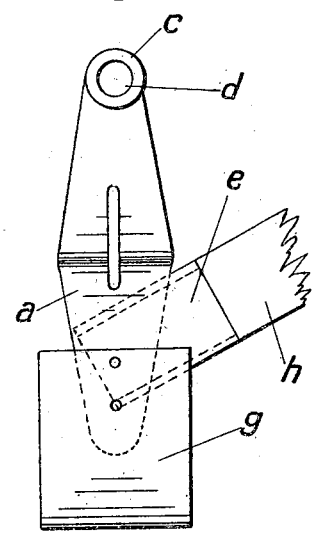
Fig. 2 is a side elevation of Fig. 1.
Figure 3:
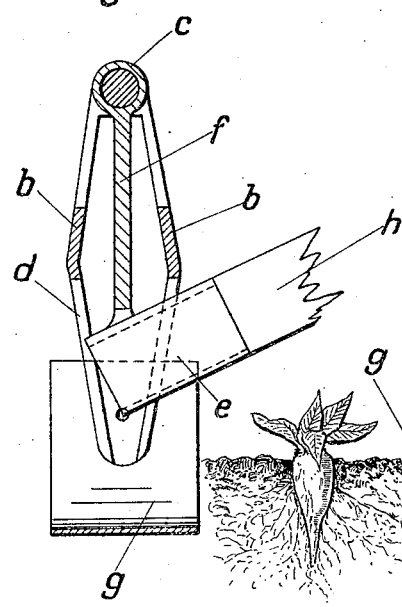
Fig. 3 is a cross-section on the line A—B of Fig. 1.

A frame $b$ provided with two arms $a$ carries a bolt $d$ in bearings $c$. A socket $e$ for one end of the handle is provided with a tongue $f$ oscillatably mounted on the bolt $d$. The tongue $f$ is free to oscillate between the members $b$ of the frame as shown in Figure 1, thus permitting the free end of the handle to be raised or lowered as may be required. The arms $a$ carry on their outer surfaces a U-shaped steel band $g$ which is preferably sharpened on its two edges so that it can work with both sides. A handle $h$ of suitable length is fitted in the socket $e$ and the implement is simply moved backwards and forwards, like a scuffle hoe, the blade or band $g$ tilling, as will be understood on the forward as also on the rearward movement of the implement, and working the soil at each forward and rearward stroke. The implement has no idle movement.

In spite of this, increased efficient safe, uniform and absolutely reliable work is possible with a minimum exertion owing to the low centre of gravity.

The tool constructed like a steel band according to the invention presents the special advantage that it easily adapts itself to the conditions of the soil. The implement is moved backwards and forwards without a carriage and can therefore be guided in the desired manner to suit the soil to be treated and may be used for a great variety of purposes. On this account the use of a tool made of resilient material is of great importance for the implement.

The stroke in spite of the low position of the point of attack is specially favourable.

Figure 4:
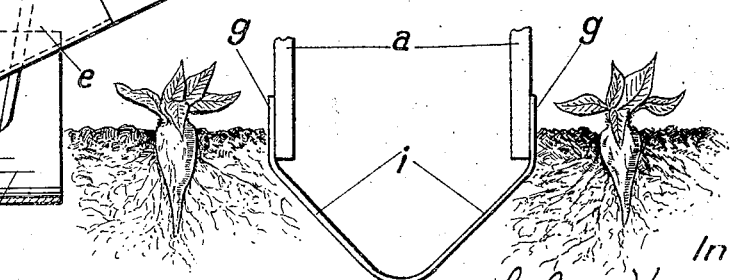
Fig. 4 shows in front elevation the tapered implement at work.

According to the form of construction illustrated in Fig. 4 the steel band $g$ operating with both sides tapers to a point $i$. Hereby it is possible to loosen the soil between the young, delicate plants without destroying the spreading roots, as may be seen from Fig. 4.

Claims:

1. A soil loosening and hoeing implement operated by hand by means of a handle with double acting tool oscillatable in the direction of displacement, comprising in combination a frame, a tool mounted on said frame, a bearing in said frame, and an oscillatable tongue mounted in said bearing and adapted to receive the handle.

2. A soil loosening and hoeing implement operated by hand by means of a handle with double acting tool oscillatable in the direction of displacement comprising in combination a frame, a tool mounted on said frame, a bearing in said frame, an oscillatable tongue mounted in said bearing and adapted to receive the handle, and stops adapted to limit the movement of said tongue.

In witness whereof I affix my signature.

LOTHAR KOENNECKE.